Patented Oct. 4, 1932

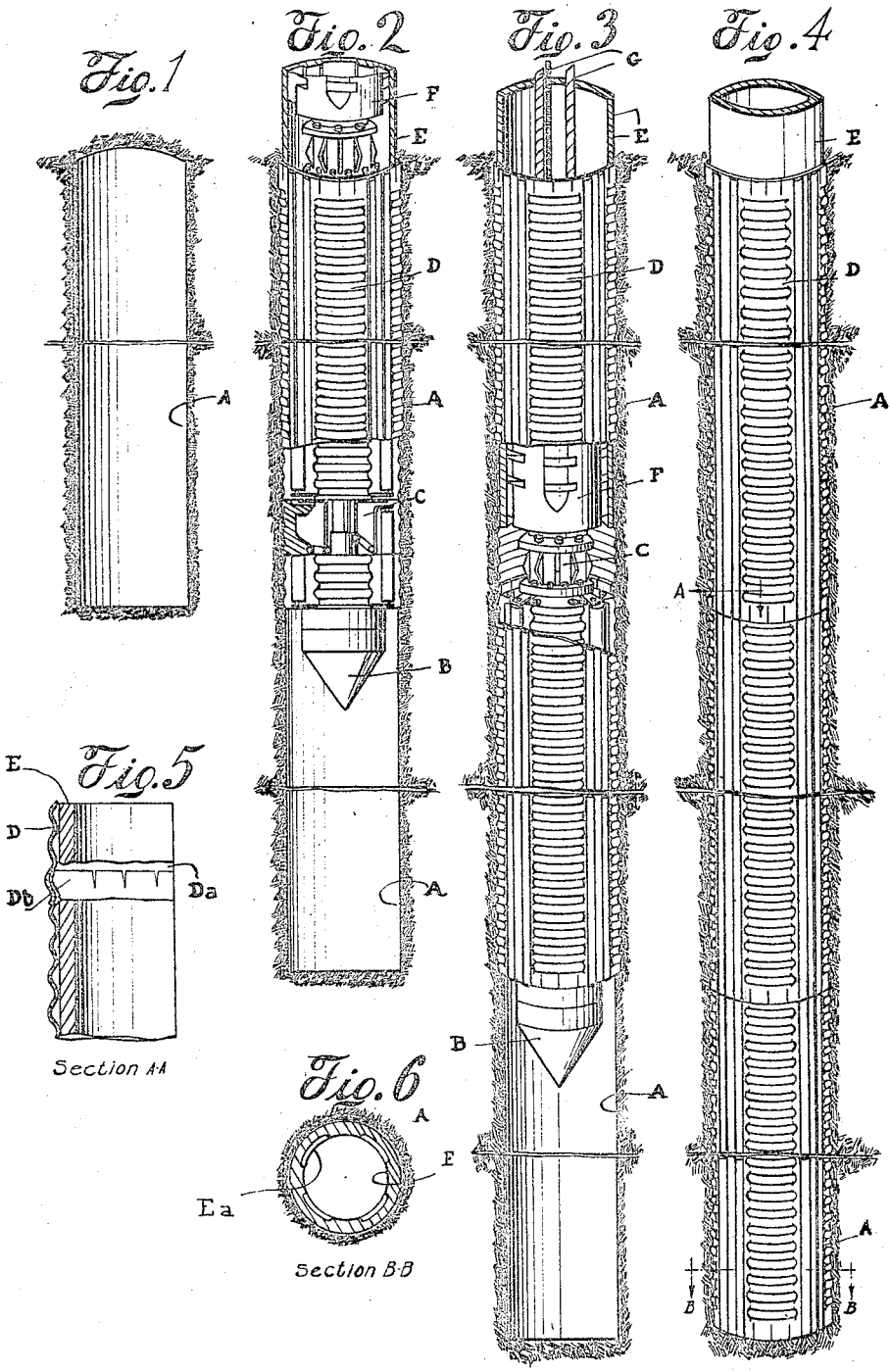

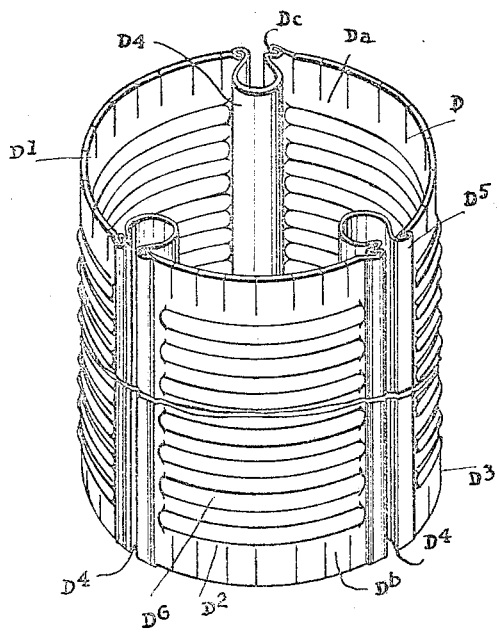
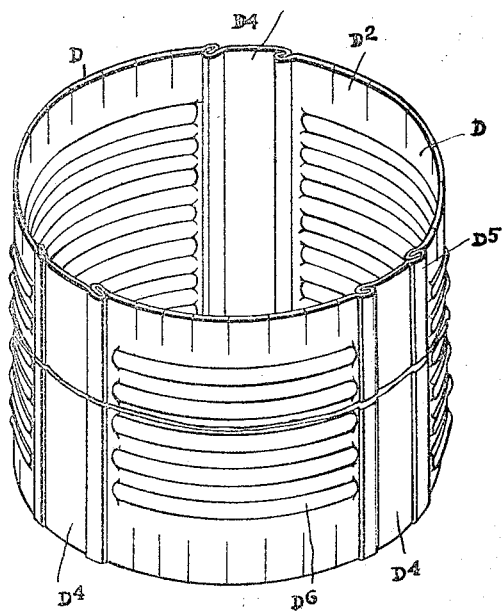
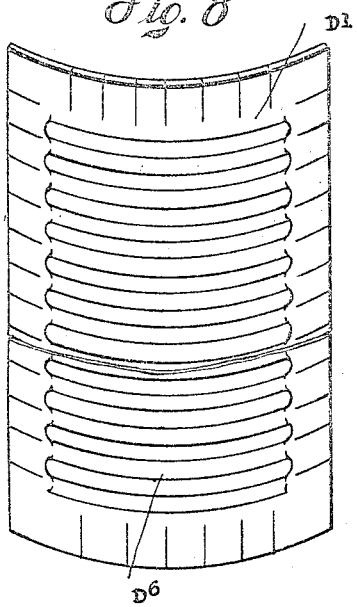
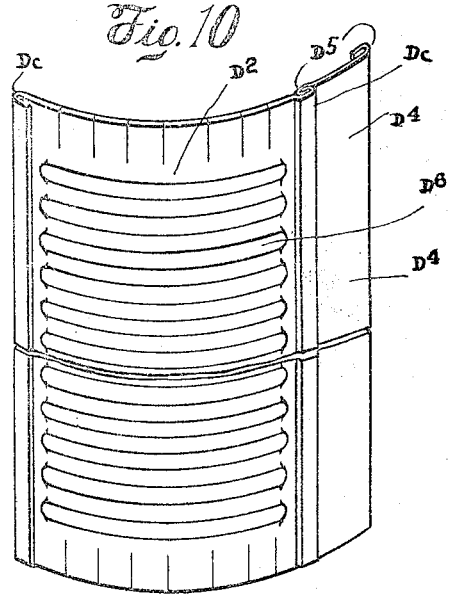
Richard P. Simmons
INVENTOR

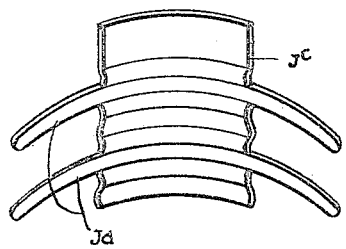
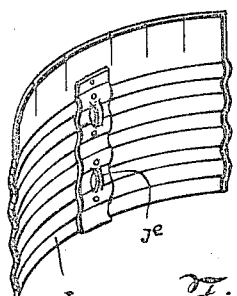
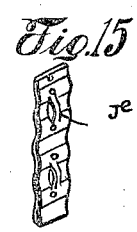
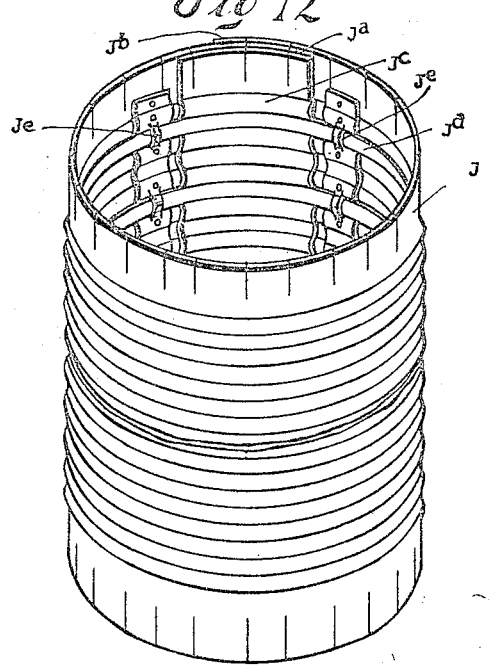
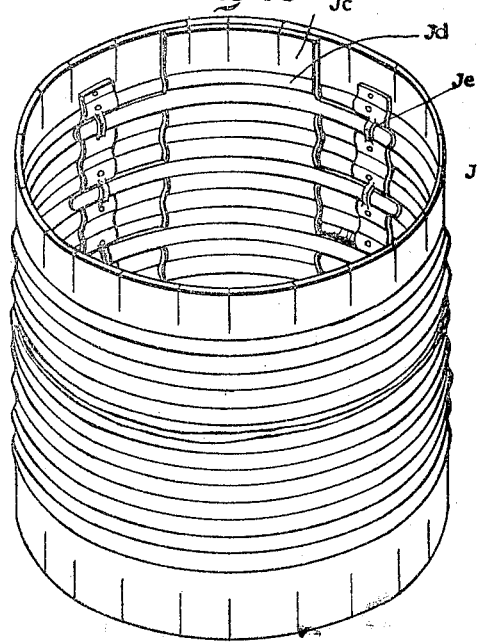
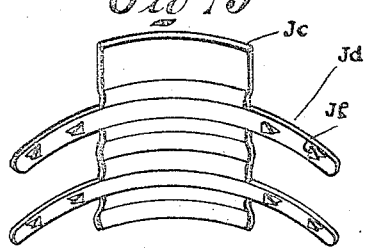
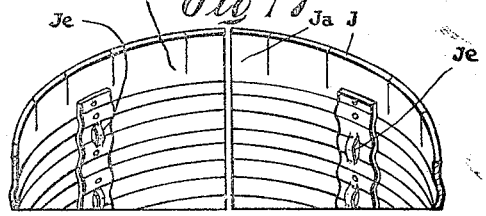

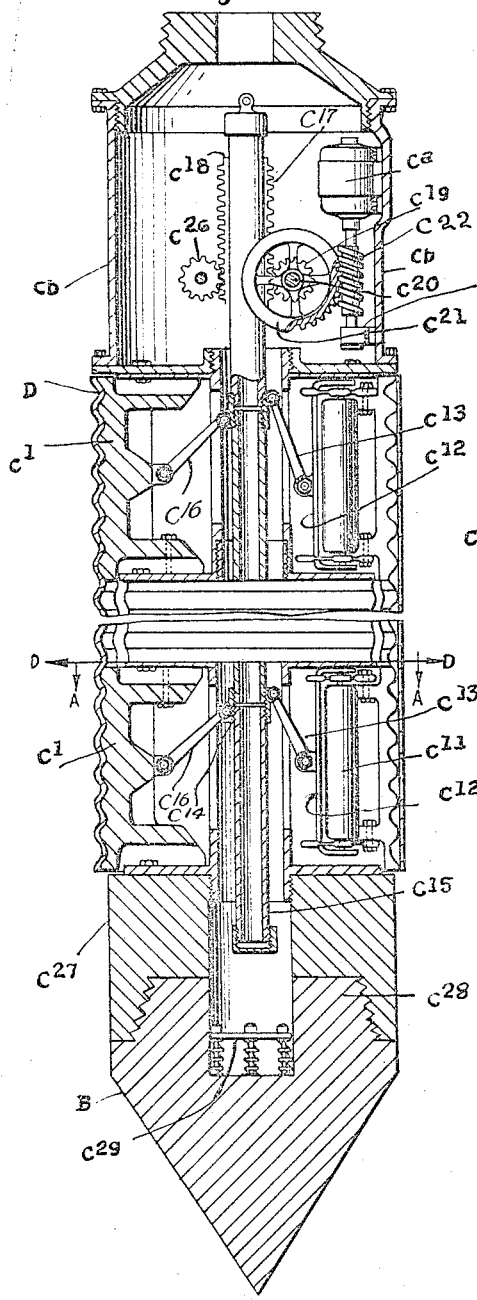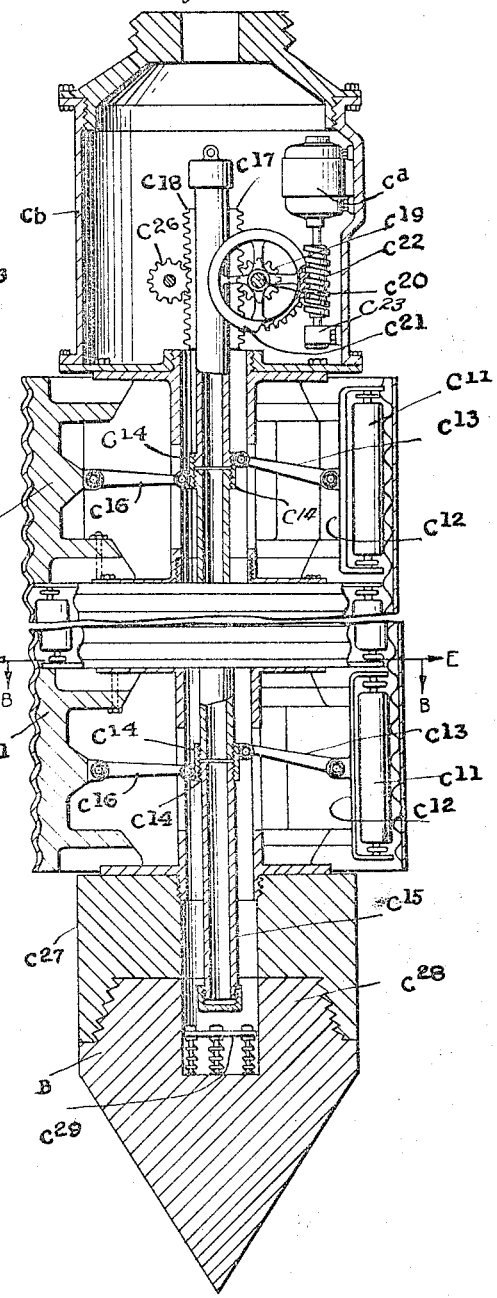

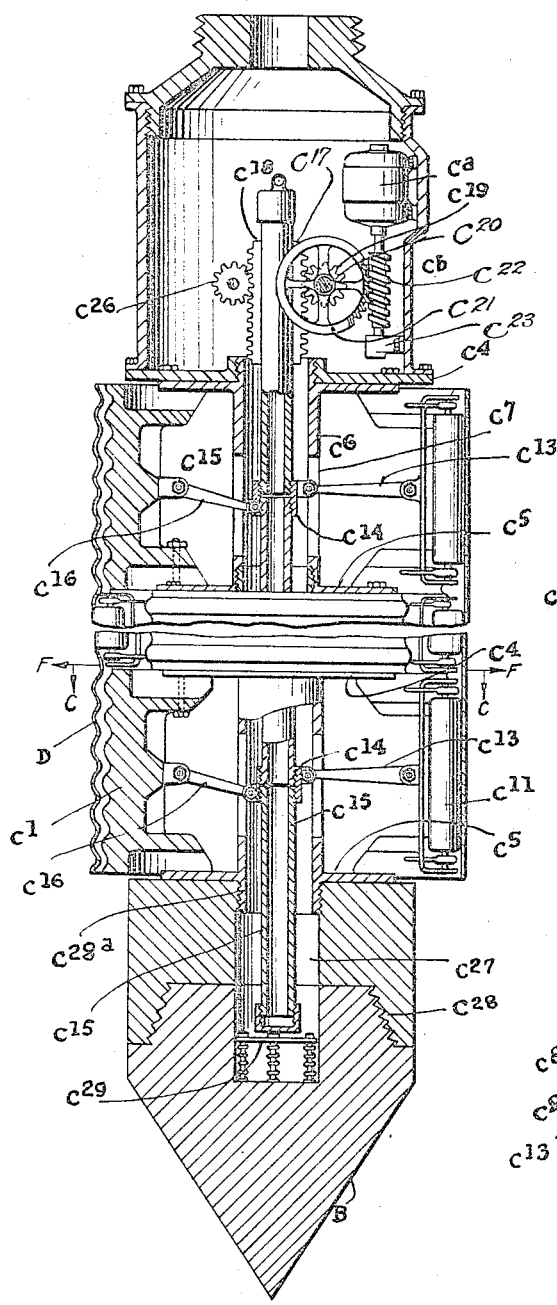
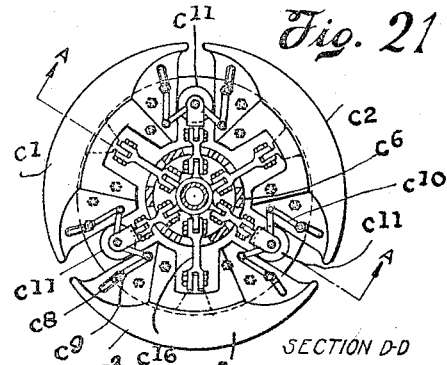
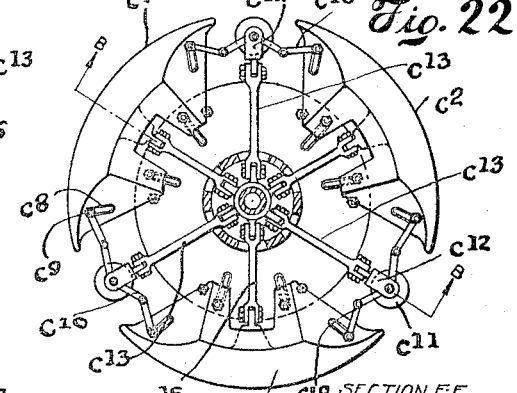
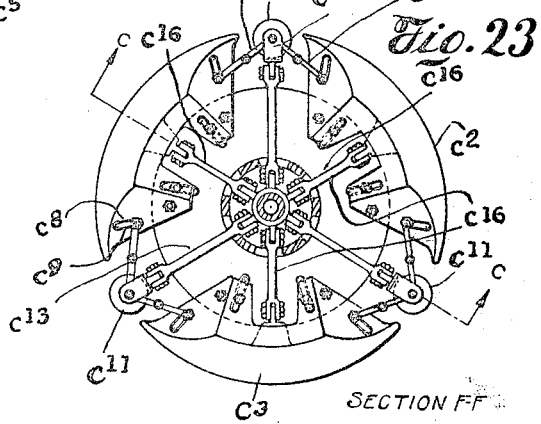

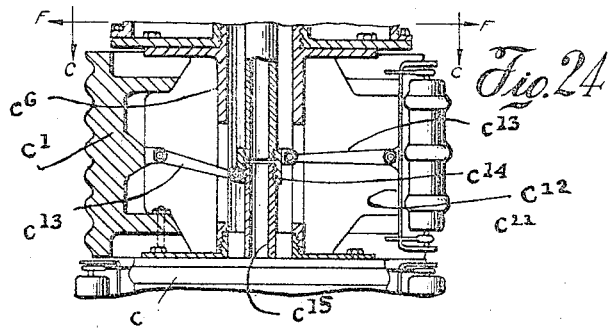
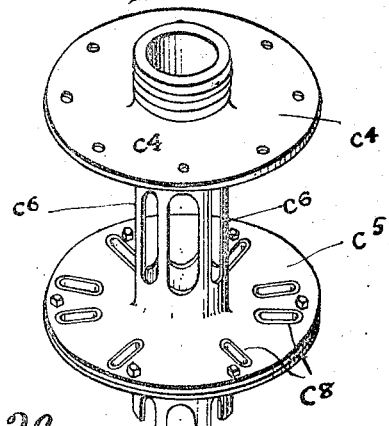
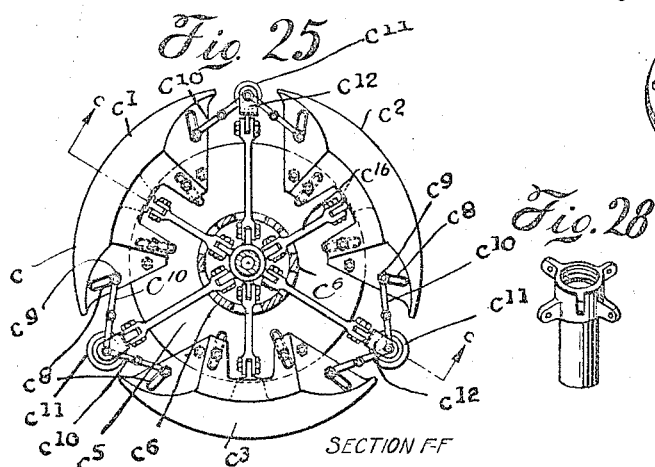
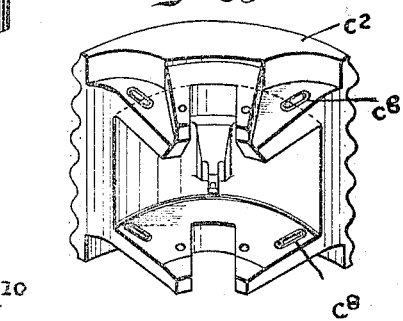
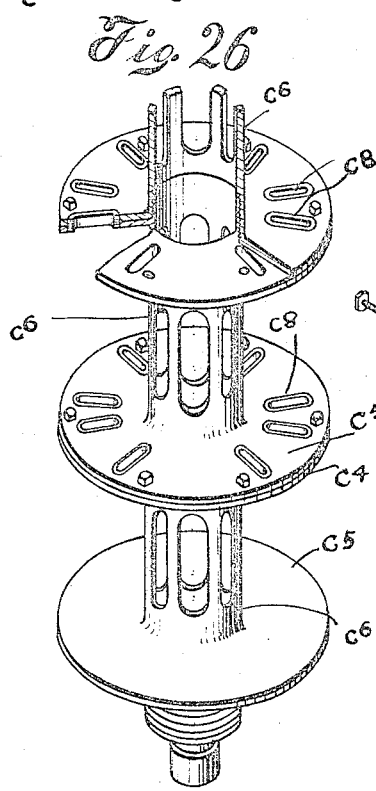
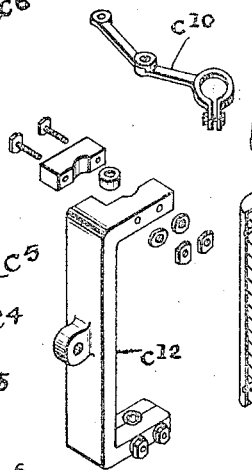
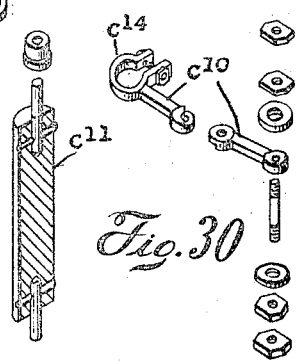

1,880,218

UNITED STATES PATENT OFFICE

RICHARD P. SIMMONS, OF NEW YORK, N. Y.

METHOD OF LINING OIL WELLS AND MEANS THEREFOR

Application filed October 1, 1930. Serial No. 485,841.

This invention relates to improvements in methods for lining oil and gas producing wells, and its leading object is to provide a method for lining a well with metal while the well casing is being introduced into working position, so that the pressure of the wall of the well against the well casing may be resisted by the metal lining, with a minimum of friction exerted upon the well casing, which is also constructed of metal.

In the drilling of oil and gas producing wells a hole is drilled into the earth or ground of the favored diameter, and then a metal well casing is progressively lowered into this hole. The pressure of the ground against the well casing produces considerable friction to resist the turning and sliding of the well casing. If the diameter of the well be increased, to give a well of larger capacity, then the circumferential area of the well casing is also increased, together with the total pressure exerted by the ground upon the well casing. This increases the frictional resistance of the ground against the well casing so much, that the use of large diameter well casings, to support the walls of large diameter wells, of say, for example, twenty or twenty-four inches, is considered impractical, with present equipment. The result of this condition is that certain operative benefits which result from the use of large diameter oil wells, or which are derived from their excavation by larger and more highly powered tools, cannot be secured.

The main object of the present method is to provide a well lining and method of installing the same, which involves the progressive introduction of normally collapsed lining sections, and their expansion to coupled position against the wall of the well as the same is being constructed by excavation, while the tubular and non-collapsed well casing is progressively lowered into the well.

Another object of the invention is the provision of a method of lining oil wells during their construction, to prevent the caving of the wall of the well and to dam off water from entering the well, which will permit the progressive lowering to place of the coupled well casing, and its turning for the purpose of operating any tools carried thereby with a frictional resistance greatly below that of well casings in direct physical contact with the caving ground, thus permitting the construction of larger diameter oil wells.

Another object of the invention is the provision of a well lining, consisting of sections of corrugated metal, having meeting edge portions arranged in overlapping collapsed relation, so that the same may be progressively inserted in a length composed of expanded and coupled sections of the lining, and progressively coupled in place.

A further object of the invention is the provision of a well lining consisting of normally collapsed formed metal units, designed to be expanded, one within the other, to coupled position, and the further provision of an expanding tool or means, whereby the units can be progressively inserted in a length of coupled lining units, and then forcibly expanded into coupled position with the lower end of the placed units, so as to form means for preventing the caving of the wall of the well and means for excluding the water from the bore of the well.

With the above and other objects in view the invention consists in certain new and useful constructions, combinations, and arrangements of parts, clearly described in the following specification, and fully illustrated in the accompanying drawings, in which:—

Fig. 1 is a vertical section taken through a large diameter well in the first stage of its development.

Fig. 2 is a similar view, showing the next step in the development of the well, and illustrating the lining unit and the expanding device, partly in section and partly in elevation, showing the well casing in the upper end of the well.

Fig. 3 is another similar view, showing the well further deepened, and the expanding unit located to couple a second lining unit in place.

Fig. 4 is another similar view, showing a completed length of the well, with several lining units coupled in position, the well and lining being broken away for convenience.

Fig. 5 is a detail vertical sectional view, taken on an enlarged scale, on line A—A of Fig. 4, showing the well casing broken away to expose the joint between the meeting ends of lining units, looking in the direction of the arrows.

Fig. 6 is a transverse sectional view, taken on line B—B, of Fig. 4, looking in the direction of the arrows.

Fig. 7 is a view in perspective, of a lining unit, broken away for convenience, showing the unit contracted.

Fig. 8 is a view in perspective of one of the section plates of the unit, broken away for convenience.

Fig. 9 is a view, similar to Fig. 7, but showing the lining unit expanded.

Fig. 10 is another perspective view of still another wall section of the lining unit, broken away for convenience.

Fig. 11 is a view in perspective of a bridge plate of an alternate form of the lining.

Fig. 12 is a view in perspective of the alternate form of the lining unit contract, broken away for convenience.

Fig. 13 is a view in perspective of an alternate form of the bridge plate, showing locking tongues formed thereon.

Fig. 14 is a view in perspective, showing a strip carrying locking tongue welded in place, on a portion of the wall of the alternate lining unit, which is broken away for convenience.

Fig. 15 is a perspective view of the metal strip detached.

Fig. 16 is a view similar to Fig. 12, showing the same lining unit expanded.

Fig. 17 is a fragmentary sectional view, showing the expanded wall portions in abutting edge relation.

Fig. 18 is a vertical central sectional view through the expanding unit, showing a lining unit thereon, and both units in their contracted positions.

Fig. 19 is a similar view, showing both units in their expanded positions.

Fig. 20 is a vertical sectional view through the expanding unit, showing another lining unit mounted thereon, both being shown partly expanded.

Fig. 21 is a transverse sectional view, taken on line D—D, looking in the direction of the arrows A—A of Fig. 18.

Fig. 22 is a similar view, taken on line E—E of Fig. 19, looking in the direction of the arrows B—B.

Fig. 23 is another similar view, taken on line F—F of Fig. 20, looking in the direction of the arrows C—C of Fig. 20.

Fig. 24 is a fragmentary vertical sectional view, showing a slightly modified form of the expanding unit.

Fig. 25 is a transverse sectional view, taken on line F—F of Fig. 20, looking in the direction of the arrows C—C.

Fig. 26 is a fragmentary sectional perspective view of the metal spool assembly of the expander unit.

Fig. 27 is a perspective view of the uppermost spool of the expander unit.

Fig. 28 is a detail perspective view of a connecting sleeve and spider.

Fig. 29 is a perspective view of one of the segemental jaws of the expander unit.

Fig. 30 is a view partly in section and partly in perspective, showing the detail parts of an assembly of the expander unit.

Referring to the accompanying drawings, and more particularly to Figs. 1 to 4 inclusive A designates an oil well in the progress of construction. This well is preferably formed by excavating a relatively large well opening in the ground, in a vertical plane, by any suitable drilling and excavating means.

In excavating the ground to form the well chamber A it is preferred that drilling and excavation proceed in regulation well lengths, of say approximately twenty feet, so as to produce a well chamber A of uniform diameter, which increases vertically in completed additions of the predetermined unit of length of twenty feet, more or less, as initially fixed.

After a unit of length of the oil well has been excavated, a combined percussive drill head B, lining expander C, and expansible well lining D, is inserted in the well. This well lining D consists of units of fixed length, of approximately twenty feet, plus a crimped overlapping or end coupling portion Da, which may be several inches additional, so that the effective length of the unit in its coupled position in the well chamber A will be approximately twenty feet, or that which is determined as the unit of excavating the well chamber.

Each unit of the well lining consists of a metal wall of sheet steel, which is normally contracted or partly collapsed upon itself. The contracted or partially collapsed unit of the well lining is mounted upon and interlocked with the spreader or expander C, the lower end of which is equipped with the percussive drill head B.

In Fig. 2 I show the combined expander and percussive drill head in position in the well chamber, after the initial well lining unit D has been expanded into physical contact with the wall of the well.

The percussive head itself is smaller than the bore of the well, so that it will freely pass through the expanded lining units D, while the expander itself is also smaller than the bore of the well after the lining has been expanded to place, when the expander is in its contracted position.

After the first lining unit has been expanded against the well wall, the well is deepened. This may be accomplished by the percussive action of the drill head B, by means of a percussive unit coupled to the upper end of the expander, and producing a percussive action upon the conical point of the drill head B, through the body of the expander unit C.

The expander unit C is first expanded to force the lining unit carried thereby against the wall of the well, and is then contracted to permit of the withdrawal of the expander from the well. The expanded lining unit will, because of the irregularities of its formation, interlock with the geological materials which make up the wall of the well, and will remain in fixed position against dropping. The next succeeding lining unit is then mounted on the contracted expander C, and the two are then inserted through the previously expanded lining unit. Due to the fact that both the expander and the lining unit are partially collapsed, or in contracted positions, this is possible.

After the first lining unit has been expanded into place within the oil well, the lowermost section of the well casing E is placed in position at the head of the well. This well casing section embodies certain improvements disclosed by me in my copending applications for patent, namely: Serial Number 401,445, filed Oct. 22nd, 1929; Serial Number 192,449, filed May 18, 1927; Serial Number 401,446, filed Oct. 23rd, 1929.

The particular features of this improved well casing, herein utilized, is to provide means for locking or unlocking equipment used for selective drilling or other subsequent operations. The locking head F is designed to cooperate with the splines or keyways of the well casing to lock any particular equipment against relative rotary movement in the casing, and to permit relative sliding or longitudinal movement thereon, or, if necessary, to lock the particular equipment of well unit against such sliding movement. The percussive actuating or motorized unit may be enclosed in the housing for the locking head F, or coupled thereto, so that a percussive action can be imparted to the head B; or by holding the locking means of the locking head F free for longitudinal sliding the whole assembly, including said locking head, can be raised and lowered in the well, to cause the head B to pound against the earth.

After the first lining unit has been placed in position the next one is lowered within and below the one already placed in position, a distance of approximately twenty feet. The upper end of each lining unit is formed with a crimped coupling end $Db$ for connecting the meeting ends of the units, designed to engage the end $Da$, and form a continuous tubular well lining. The normally contracted lining unit is previously coated along its edges with a sealing substance, such as tar, asphaltum, or other suitable material.

After each lining unit has been expanded against the wall of the partially formed well, the combined expander and drill head A, the combined expander and drill head are raised by means of the cables G. The interlocking supporting connection between the locking head F and the well casing E is such that free vertical withdrawal of the locking head, and the combined expander and drill head, is permitted, but the downward movement of the expander is limited by the stops carried by the lower section of the well casing E, which are a part of its internal splines.

When the coupling head F therefore engages the limit stops of the well casing, the upper end of the contracted lining unit carried by the contracted expander will be in correct overlapping relation with the lower end of the previously expanded lining unit, and the expander may now be expanded, by energizing the electrical motor $C^1$, carried by the upper end of the expander head $C^2$.

As the depth of the well is progressively increased, additional units of the lining are lowered into place and expanded into coupled relation with the ground and the previously assembled length of the well lining, until the full length of the well has been lined with the units D. As the metal lining D is thus progressively assembled in place, the well casing F is progressively lowered within the coupled well lining composed of the units D.

Where the geological materials encountered are such as to permit of percussive drilling, the drill head B may be operated. But when these materials require rotary drilling the combined expander and drill head are removed and rotary drilling equipment is mounted on the locking head F, and the combined units are then lowered to place in the well and operated by turning the well casing E. The details of the tools employed for rotary drilling need not here be shown or described.

When such a condition develops as to require rotary drilling, and necessarily the turning of the well casing E, it is important that the frictional resistance between the well casing and the wall of the well engaged thereby be reduced to a minimum, and that ground pressure against the rotary well casing be eliminated as far as possible. If this ground pressure acts upon the well casing the turning effort required to turn the well casing will be so great as to render the operation of rotary drilling impossible.

The metal lining units D directly receive the pressure of the ground against the wall of the well, and prevent any caving upon the well casing. These units are expanded snugly against the ground materials forming the nude wall of the well A, and effectively support these wall materials against caving, while at the same time excluding the water from seeping into the well.

When expanded into wall-supporting position the metal lining units D will not contract against the well casing E, and by allowing sufficient clearance between this well casing and the placed well lining the frictional resistance offered by the wall of the well to the turning of the well casing will be reduced to a minimum, and in any case will be insufficient to prevent the turning of large diameter well casings.

Each lining unit D is shown to consist of three steel or metal plates $D^1$, $D^2$, and $D^3$. These plates are made in duplicate of each other, and each is formed with a longitudinal edge portion $Dc$ on opposite sides thereof, which is folded upon itself to form a U-shaped coupling or binding element. To these coupling or binding elements $Dc$ the coupling strips $D^4$ are united, and for this purpose the opposite longitudinal edges of these coupling strips are also formed with corresponding U-shaped coupling elements $D^5$, which are designed to be interfitted with the U-shaped coupling elements $Dc$, and subjected to pressure, so as to form a watertight joint at all points of contact. The meeting surfaces may be coated with any suitable material, like tar, for making the joints safely watertight, and which may be applied after the unit is completed or before. Red or white lead or any acceptable material or substance may be employed for this purpose.

Each lining unit D thus consists, as shown, of three metal plates, and three coupling strips, which are spaced circumferentially an equal distance apart. The coupling strips are equal in length to the body steel plates $D^1$, $D^2$, and $D^3$. These body steel plates are formed, intermediate of their outer longitudinal formed edges, with parallel semi-annular ribs or corrugations $D^6$, which stiffen or strengthen the plates, and also form means for interlocking the lining unit with the geological materials through which the well A is driven.

The lining unit is contracted in its normal or original, pre-assembly condition, by forming the coupling strips C-shaped, so that they will thereby retract the body plates $D^1$, $D^2$, and $D^3$ upon each other, thus reducing the diameter of the unit in its contracted condition.

The body plates are directly engaged by the segmental jaws $C^1$, $C^2$, and $C^3$ of the expander C. These jaws are arranged in similar groups, one group being placed endwise against the other group, and the whole series of groups being coupled together, so that the individual jaws of each group will be in the same vertical planes as the individual jaws of all other groups.

Each group of segmental jaws is arranged to slide radially between the upper guide plate or disc $C^4$ and the lower guide plate or disc $C^5$ which are rigidly spaced apart by means of the tubular post $C^6$. These guide plates and the connecting tubular post thus form a metal spool assembly. For each group of radially shiftable jaws there is a metal spool, and the adjacent end plates of these superimposed metal spools are positively connected to each other by intermediate or coupling discs or plates $C^7$.

The plates $C^4$ and $C^5$ are formed with radially disposed guide slots $C^8$ in which the pins $C^9$ of the toggle lever links $C^{10}$ operate. The links are pivotally connected at their inner ends to the ends of the vertically disposed roller $C^{11}$. Two of said links are arranged on each side of the roller, and are pivoted at their adjacent ends to each other. A yoke $C^{12}$ is pivotally associated with the ends of the roller and to this yoke a pull and push link $C^{13}$ is pivotally connected at its outer end.

One of these rollers is arranged to work in the gap between the confronting vertical edges of the segmental jaws $C^1$, $C^2$, and $C^3$, and as there are three of such gaps three of these rollers are employed. The inner ends of the push and pull links $C^{13}$ are pivotally connected to the sleeves $C^{14}$, which are fixed upon the central tubular shaft $C^{15}$, and which sleeves may form splicing or coupling means for uniting sections of said tubular shaft to each other. To these splicing sleeves $C^{14}$ a series of push and pull links $C^{16}$ are pivotally connected, at points intermediate of the pivotal connections of the push and pull links $C^{13}$, which operate the rollers. The outer ends of these second series of push and pull links $C^{16}$ are pivotally connected to the segmental jaws $C^1$, $C^2$, and $C^3$.

The pivotal connections of the push and pull links bars $C^{13}$ of the rollers are located on the tubular shaft above the pivot connections of the push and pull bars or links $C^{16}$ of the segmental jaws, and this requires that the bars or links $C^{13}$ be slightly longer than the bars or links $C^{16}$. The mechanical effect of this is that the rollers are caused to shift radially at a slightly more rapid rate, both inwardly and outwardly, so that the rollers reach their outward limits of movement before the segmental jaws and are withdrawn from such positions in advance of the withdrawal of the segmental jaws.

The tubular shaft $C^{15}$ extends vertically through the tubular posts $C^6$ of the spool assemblies, and on its upper end is equipped with gear racks $C^{17}$ and $C^{18}$. The gear rack $C^{17}$ is engaged by the gear $C^{19}$, which is mounted on the shaft $C^{20}$, which shaft is equipped with a larger gear $C^{21}$, which is engaged by the worm $C^{22}$, which operates in bearings $C^{23}$, carried by the casing $C^{24}$, mounted on the uppermost metal spool assembly. This worm $C^{22}$ is coupled to the shaft of the electrical motor $C^{25}$, which is controlled by a reversible switch from the head of the well, through the usual connecting cable. The gear rack $C^{18}$ is engaged by an idler gear $C^{26}$, which serves to maintain the tubular shaft in its proper central position, whereby the driving gear will always be in mesh with the gear rack $C^{17}$.

By energizing the electrical motor the shiftable tubular shaft is moved vertically, causing the segmental jaws and the rollers to be shifted radially.

The lower end of the tubular shaft projects into a chamber or passage formed in a coupling member $C^{27}$, which is screw threaded on the lowermost spool assembly, by the nipple $C^{28a}$, and this lower end of the tubular shaft is adapted to engage the spring cushioned abutment plate $C^{29}$, which is carried by the percussive drill bit or head.

The shiftable rollers are adapted to engage the coupling strips of C-shaped formation, which unite the body plates of the lining unit, and to reverse the curvature of the same. When internal pressure is applied against these coupling strips the lining unit is expanded against the wall of the well A. The corrugated outer faces of the segmental jaws prevent mutilation of the body plates. The coupling strips uniting these body plates are made of steel of sufficient malleability to bend readily when pressure is applied internally against them, and to retain their form after being opened up, so that they will not exert any spring tension to contract the lining unit. In order to allow for the free movement of the push and pull links or bars the tubular posts of the spools are formed with vertical slots through which the inner ends of these links or bars work.

Another form of the lining unit consists of a tubular shell J, formed of one piece of sheet metal, curved upon itself to provide overlapping edge portions $Ja$ and $Jb$. A bridge strip $Jc$ is arranged to bridge the gap between these overlapping edges. The body of the shell J is formed with annular corrugations, like a culvert, and the body of the strip $Jc$ is formed with similar or corresponding corrugations, designed to match or register with those of the shell itself. This bridge strip is also provided with curved wires or rods $Jd$, which are mounted transversely thereof, and which slidably engage the keepers or eyes $Je$ welded on or formed by a struck-out stamping operation from the metal of the shell J. The rods $Jd$ are preferably formed with ratchet teeth $Jf$ which permit sliding movement of the same through the eyes or keepers $Je$, to permit the lining unit to be expanded, but which engage the edges of the eyes or keepers to resist inward movement in the opposite direction of the wall of the shell J.

When the expander is used in connection with this form of lining unit, the rollers of the expander unit are corrugated so as to match the corrugations of the shell J and its bridge strip. When the rollers are expanded against this bridge strip they force the eyes or keepers into snug interlocking engagement with the teeth of the sliding wires or rods, and thus effectively lock the lining unit wall in its expanded condition against the wall of the well.

In carrying out the improved method it is preferred that the well A be excavated by the use of drilling and core removing tools not herein disclosed, but shown in my copending applications for patent, namely:—

After a length of the well has thus been excavated and the drilling and core removing equipment has been removed, caving of the wall of the well thus formed is liable to occur when instable ground has been pierced, such as quick sand or materials subject to flow under lateral pressure or when saturated. When the excavating tools are withdrawn and such materials cave in to fill or partly fill the well chamber, it is necessary that these materials be again forced into wall position, and for this purpose the percussive action of the drill head is extremely useful. By operating this drill head and causing it to be progressively lowered against the materials thus filling the well chamber, the lining unit can also be lowered and expanded to coupled relation with the next uppermost lining unit.

This method is particularly useful in drilling large diameter well chambers. Percussive drilling is commonly used for driving small diameter wells. But it is not always practical or economical when the mass of material encountered by large diameter wells has to be laterally displaced.

In the current practice of driving wells, several lines of well casing are progressively placed. First the well is drilled with its maximum capacity, and the well of this hole is supported by a well casing fitting against it. Then a smaller hole is drilled, and a well casing extending from the surface of the ground through the placed well casing, is placed against the wall of the smaller hole. Then a still smaller hole is drilled, and the wall of this hole is again supported by a well casing which extends from the surface of the ground, through the first and second lines of casing.

The use of these lines of well casing involves a tremendous expense and necessarily delays the opening of an oil well.

My improved method provides a system of supporting the wall of a large diameter well, so that one line of main well casing alone is necessary to seal the well chamber against the inflow of water. The main well casing can be turned to operate any rotary drilling and excavating tools carried thereby, because the intermediate well lining supports the natural wall of the well against collapse or caving, and thus reduces the frictional resistance between the main well casing and the wall of the well, as faced with this metal lining, to a minimum.

I claim as new and desire to protect by Letters Patent:—

1. Means for placing an oil well lining consisting of a series of radially shiftable jaws having corrugated outer faces, means for moving said jaws inwardly and outwardly, a series of rollers mounted to move in the gaps between the jaws, and means for moving said rollers inwardly and outwardly simultaneously with the movement of the jaws but at a different rate of motion thereto.

2. The method of lining an oil well which comprises the insertion in the bore of a circumferentially contracted metal sleeve and expanding that against the walls of the bore, following this with the insertion and expansion of a second sleeve, and finally coupling the two by forming interlocking corrugations on the same where they overlap.

3. The method of lining an oil well which comprises the insertion in the bore of a circumferentially contracted metal sleeve and expanding that against the walls of the bore, following this with the insertion and expansion of a second sleeve, and finally forming continuous corrugations on the two extending throughout the circumference and at the line where they overlap, said corrugations being formed simultaneously to provide an interlock.

4. The method of lining an oil well which comprises the insertion in the well as the same is bored of metal lining sections and expanding the same into contact with the natural wall of the well, the expansion of any one section being simultaneously accompanied with an interlocking operation with the preceding section.

5. The method of oil well drilling which comprises the boring of the well in steps each of a length corresponding to the length of a lining section, disposing a lining section on a carrier provided with a percussive tool at its lower end, the lining being circumferentially contracted, then displacing any fallen earth with the percussive tool until the lining has been lowered the length corresponding to the length of a drilling step, and then expanding the lining into contact with the wall of the well through the instrumentality of the carrier.

6. The method of well drilling which comprises drilling the well in steps of which each corresponds to a length equal to the length of lining section to be employed, lowering a section of lining into the well as each drilling step is completed and expanding the lining section into contact with the wall of the well, and simultaneously coupling it to the preceding section.

7. The method of well drilling which comprises drilling the well in steps of which each corresponds to a length equal to the length of lining section to be employed, lowering a section of lining into the well as each drilling step is completed and expanding the lining section into contact with the wall of the well, and simultaneously coupling it to the preceding section by crimping it to form a positive interlock between the two.

8. The method of well drilling which comprises drilling the well in steps, lining the drilled hole with circumferentially corrugated lining sections by expanding them into contact with the walls of the hole to interlock them with the same by reason of embedding the corrugations into the wall surface thereof, and finally disposing a well casing in the lined well, so that the casing may be rotated or moved axially by reason of its limited friction with the lining due to its contact only with the peaks of the interior corrugations of the latter.

9. An oil well lining comprising a tubular section formed with circumferentially arranged corrugations and diametrically contracted for expansion into interlocking engagement with the walls of a well hole when inserted therein.

10. An oil well lining comprising a tubular section formed with circumferentially arranged corrugations and diametrically contracted for expansion into interlocking engagement with the walls of a well hole when inserted therein, the section embodying arcuate plates, and coupling strips connecting the plates at their longitudinal edges, the coupling strips being normally C-shaped in cross section and disposed wholly within the periphery of the section.

11. An oil well lining comprising a tubular section formed with circumferentially arranged corrugations and diametrically contracted for expansion into interlocking engagement with the walls of a well hole when inserted therein, the section embodying arcuate plates, and coupling strips connecting the plates at their longitudinal edges, the coupling strips being normally C-shaped in cross section and disposed wholly within the periphery of the section and constituting the only spreading portions of the section when the same is expanded.

12. An oil well lining section comprising a tubular section longitudinally split with the edges of the section at the split disposed in overlapping relation, and an arcuate backing plate disposed directly behind the overlapped portions and having guides in which it is mounted, the section being circumferentially expandible to dispose the overlapped edges in abutting engagement when the line of contact of said edges is bridged by said backing plate.

13. An oil well lining section comprising a tubular section longitudinally split with the edges of the section at the split disposed in overlapping relation, and an arcuate backing plate disposed directly behind the overlapped portions and having guides in which it is mounted, the section being circumferentially expandible to dispose the overlapped edges in abutting engagement when the line of contact of said edges is bridged by said backing plate, said section being formed with circumferential corrugations extending continuously therearound.

14. Means for placing an oil well lining comprising a centrally disposed reciprocatory member, a series of segmental jaws movable radially with respect to said member, links connecting the jaws with said member, a driving motor, a rack carried on said member, and a worm wheel and pinion of which the latter meshes with the rack and the former with the worm driven by said motor.

15. Means for placing an oil well lining comprising a centrally disposed reciprocatory member, a series of segmental jaws movable radially with respect to said member, links connecting the jaws with said member, a driving motor, a rack carried on said member, and a worm wheel and pinion of which the latter meshes with the rack and the former with the worm driven by said motor, said member having a rack disposed diametrically to the first said rack, and a fixed pinion in mesh with the second said rack to take the lateral thrust of said member.

16. Means for placing an oil well lining comprising a series of radially shiftable jaws, a reciprocatory member, a series of rollers disposed one each between adjacent jaws, and links connecting the jaws and the rollers with said reciprocatory member.

17. Means for placing an oil well lining comprising a series of radially shiftable jaws, a reciprocatory member, a series of rollers disposed one each between adjacent jaws, and links connecting the jaws and the rollers with said reciprocatory member, the links being connected with the jaws and rollers in substantially the same horizontal plane but the jaw links being connected with the reciprocatory member in a different horizontal plane from that in which the roller links are connected with the latter.

18. Means for placing an oil well lining comprising a series of jaws, a series of rollers arranged in intercurrent relation with the jaws, and means for moving the rollers and jaws radially inwardly and outwardly simultaneously but at relatively different rates of motion.

19. Means for placing an oil well lining comprising a series of jaws, a series of rollers arranged in intercurrent relation with the jaws, and means for moving the rollers and jaws radially inwardly and outwardly simultaneously but at relatively different rates of motion, the jaws having means for engaging and retaining thereon a circumferentially contracted lining section to be expanded by the movement of the jaws and rollers.

20. An expanding device for placing well lining comprising a shaft, a plurality of guide disks mounted on the shaft in spaced relation to each other and a plurality of jaws arranged in sets with those of each set disposed between adjacent guides, each of said jaws having corrugated outer faces and being disposed for radial movement between the guides, a shaft working axially within the first said shaft, link connections between the jaws and the second said shaft, and means for imparting reciprocatory movement to the second said shaft.

21. An expanding device for placing well lining comprising a shaft, a plurality of guide disks mounted on the shaft in spaced relation to each other and a plurality of jaws arranged in sets with those of each set disposed between adjacent guides, each of said jaws having corrugated outer faces and being disposed for radial movement between the guides, a shaft working axially within the first said shaft, link connections between the jaws and the second said shaft, and a driving motor having operative connections with the second said shaft comprising a reducing gear connected with the motor and a rack and pinion connection between the reducing gear and the second said shaft.

In testimony whereof I affix my signature.

RICHARD P. SIMMONS.